(No Model.) 4 Sheets—Sheet 1.

F. KING.
ELECTRICAL DISTRIBUTION BY SECONDARY BATTERIES.

No. 399,755. Patented Mar. 19, 1889.

Witnesses,
Philip Mauro.
C. J. Hedrick.

Inventor
Frank King
by A. Pollok
his attorney.

(No Model.) 4 Sheets—Sheet 2.
F. KING.
ELECTRICAL DISTRIBUTION BY SECONDARY BATTERIES.
No. 399,755. Patented Mar. 19, 1889.
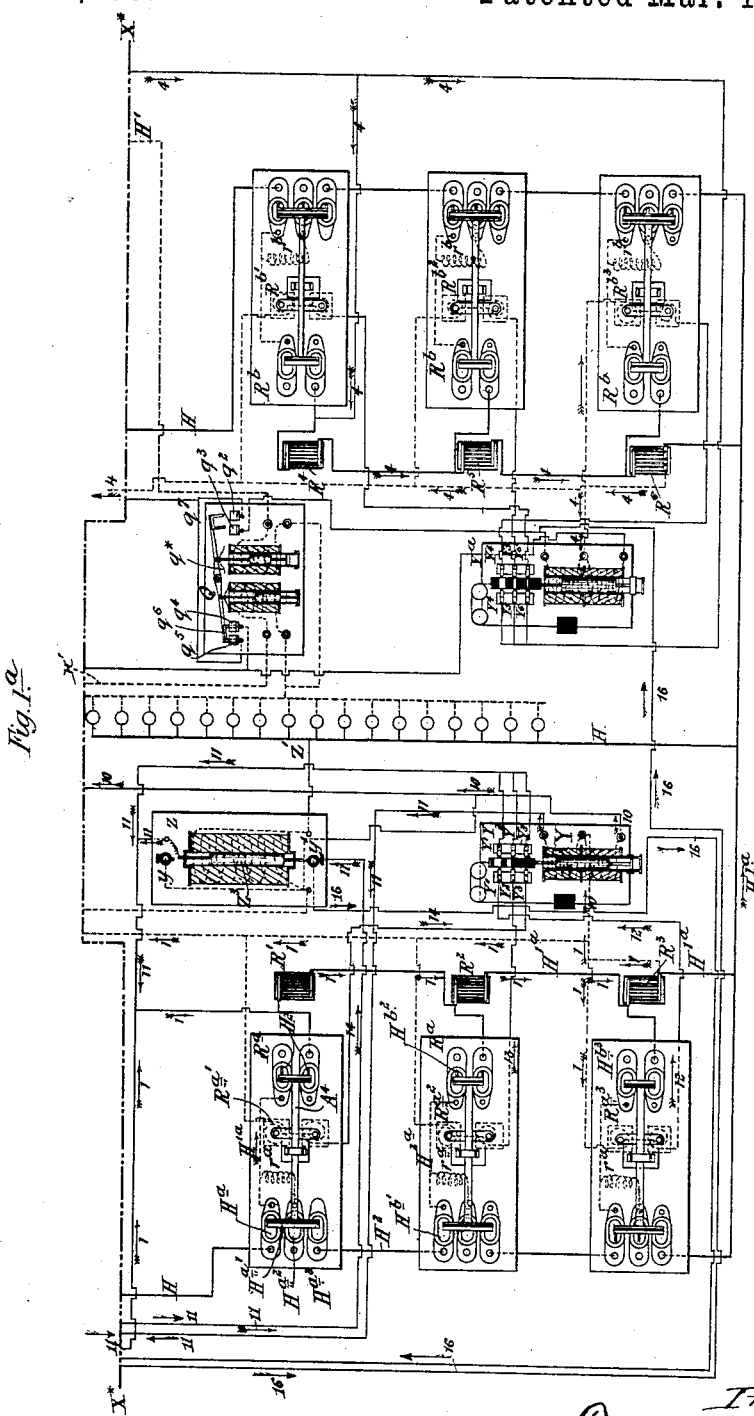

(No Model.) 4 Sheets—Sheet 3.

F. KING.
ELECTRICAL DISTRIBUTION BY SECONDARY BATTERIES.

No. 399,755. Patented Mar. 19, 1889.

Witnesses.
Philip Mauro.
C. J. Hedrick.

Inventor:
Frank King by
H Pollok
his attorney.

(No Model.) 4 Sheets—Sheet 4.
F. KING.
ELECTRICAL DISTRIBUTION BY SECONDARY BATTERIES.
No. 399,755. Patented Mar. 19, 1889.
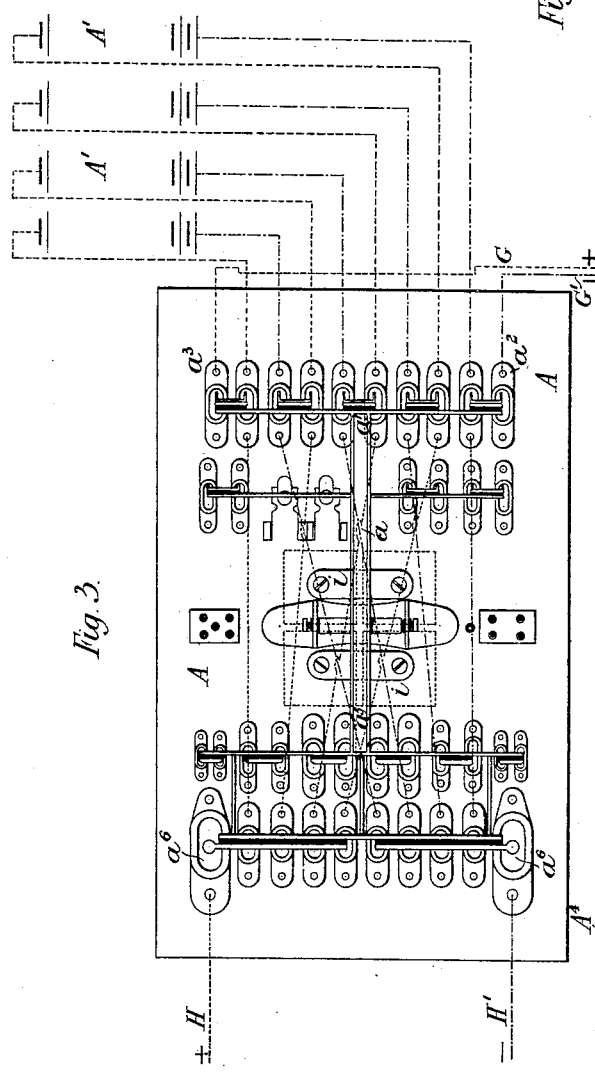
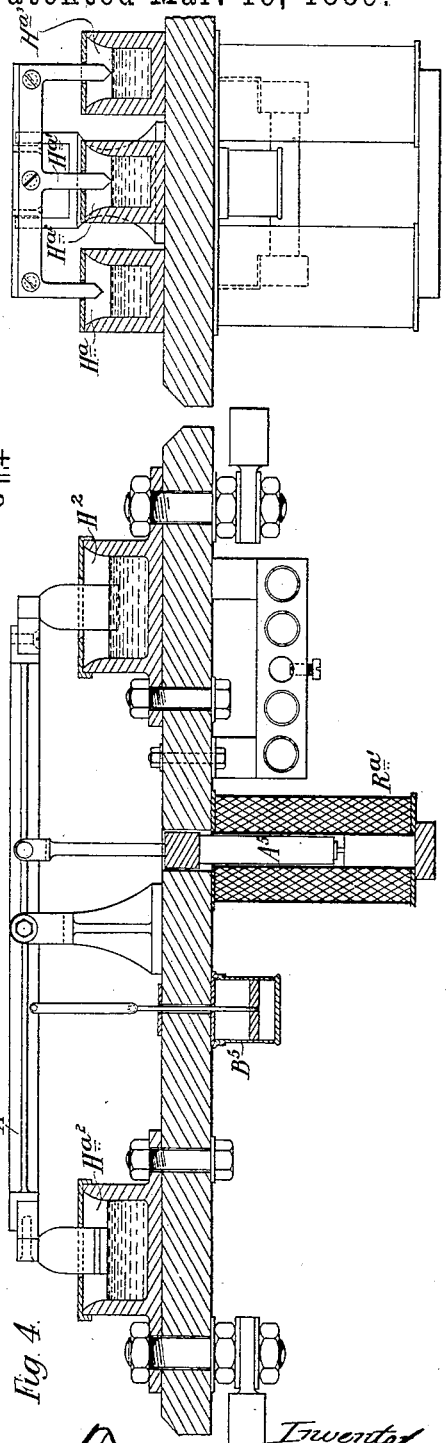
Witnesses.
Philip Mauro.
C. J. Hedrick.
Inventor
Frank King by
A. Pollok
his attorney.

UNITED STATES PATENT OFFICE.

FRANK KING, OF FULHAM, COUNTY OF MIDDLESEX, ENGLAND.

ELECTRICAL DISTRIBUTION BY SECONDARY BATTERIES.

SPECIFICATION forming part of Letters Patent No. 399,755, dated March 19, 1889.

Application filed October 22, 1888. Serial No. 288,775. (No model.) Patented in England December 7, 1887, No. 16,863.

*To all whom it may concern:*

Be it known that I, FRANK KING, a subject of the Queen of Great Britain, residing at 38 Chesilton Road, Fulham, county of Middlesex, England, have invented certain Improvements in or connected with Means for the Automatic Electrical Distribution and Charge of Secondary Batteries, (for which I have applied for a patent in Great Britain, No. 16,863, dated December 7, 1887,) of which the following is a specification.

This invention relates to combinations of apparatus and circuits hereinafter described, whereby the charge and discharge of secondary batteries is automatically accomplished without interruption of the charging or discharging circuits.

In carrying out this invention two or more pairs or sets of secondary batteries may be employed, their action of charge and discharge being alternate, except on occasion both sets of batteries may discharge into the distributing-main together. Each set of batteries is attached to a rocking switch whose function is to transfer the connections of the batteries from series or parallel, or vice versa, and by the movement of which the batteries are placed in the charging and discharging circuits, respectively, and the pressure of the gas evolved from one or more of the plates in each battery is utilized for operating the switches and special parts of the apparatus hereinafter described.

I will describe my invention with reference to the accompanying drawings.

Figure 1:
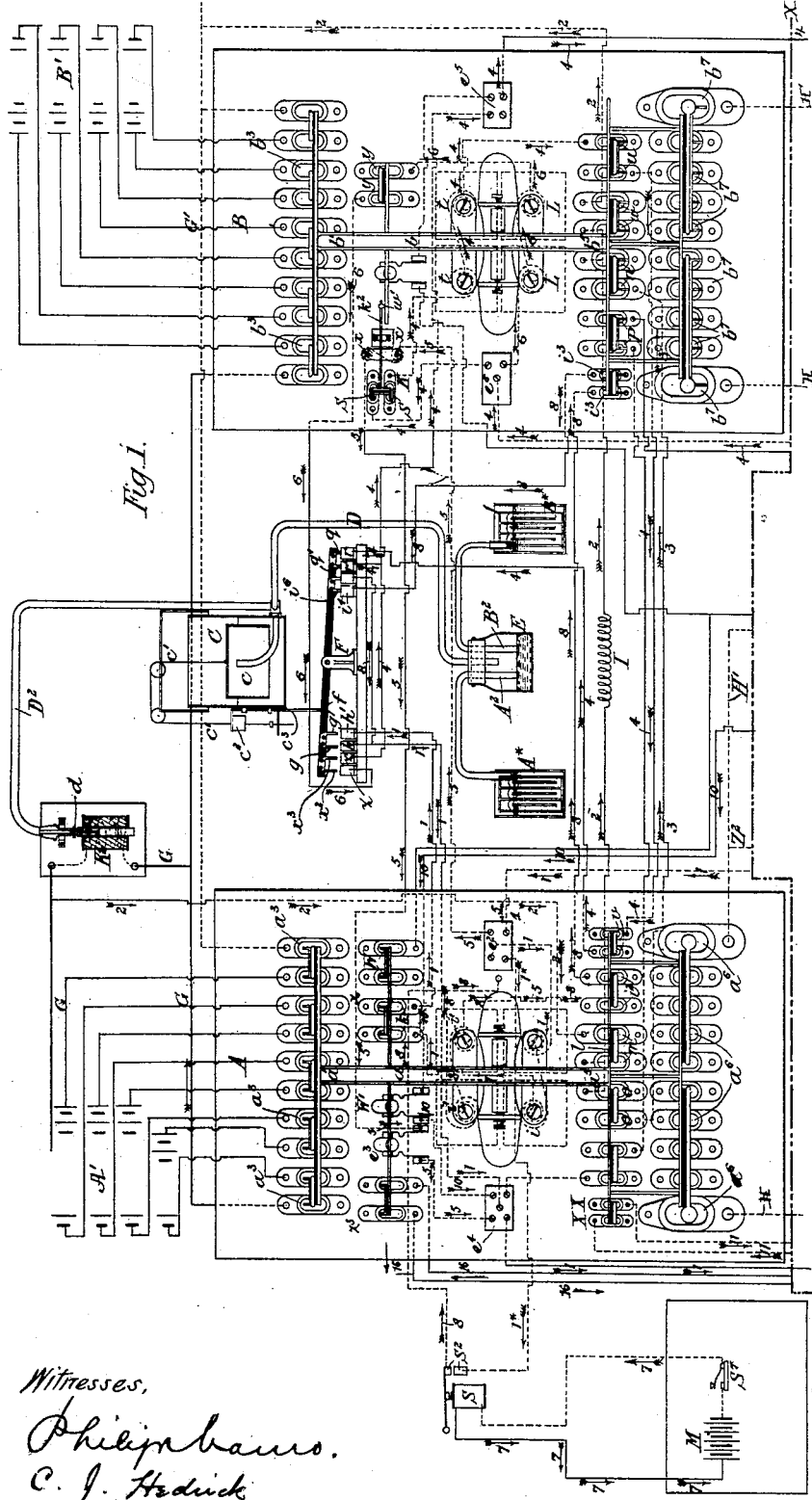
Figure 2:
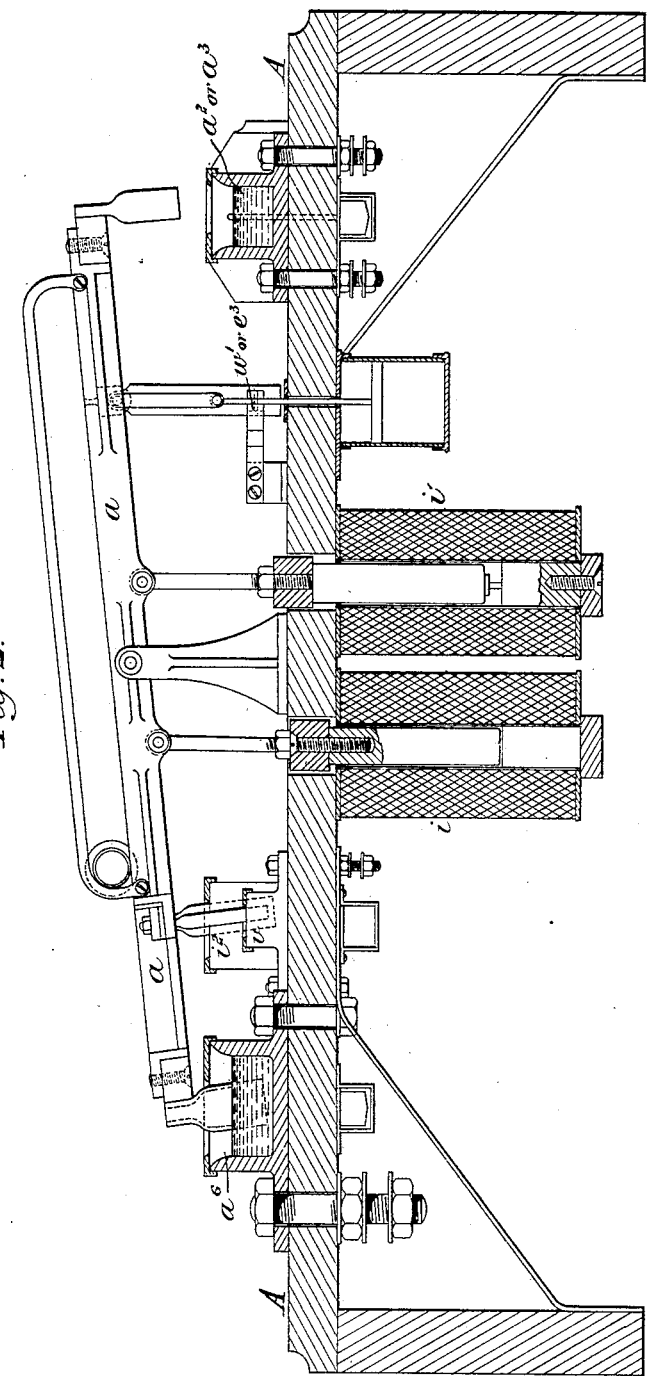

Figures 1 and 1$^a$ taken together illustrate in plan the general combination of the parts and the direction of the various currents. In order to illustrate the whole system on a sufficiently large scale, the diagram is divided in two at the broken line X*, the parts of the system above that line being shown in Fig. 1, and the parts below it in Fig. 1$^a$. Fig. 2 is a sectional elevation of one of the transposing-switches. Fig. 3 is a plan showing the connections of batteries with the rocking or transposing switch; and Figs. 4 and 5 are sections at right angles to each other of one of the resistance-switches, hereinafter referred to.

The invention has for its object to improve and simplify the means for charging and discharging secondary batteries, as described in my patent, No. 371,893, dated October 18, 1887. In its general character, as well as in many of its details, the system herein described is similar to that set forth in said patent.

Referring to Fig. 1, A B are rocking switches, each electrically connected, as shown in Fig. 3, to a separate battery or set of batteries, A' B'. (Shown in Fig. 1 and also partly shown in vertical section at A$^\times$ B$^\times$.) G G' are the charging-mains leading from the generator, and H H' are discharging-mains for supplying lamps or other source of consumption.

The hydrogen gas which is evolved in the battery under a normal constant current only when the battery has reached a condition of full charge is conducted by the pipe D into a gasometer, C, the gas generated in the respective batteries being passed through a vessel, E, containing liquid for the purpose of sealing the apertures of the tubes A$^2$ B$^2$, connecting the batteries to the said vessel and preventing the passage of the gas from one battery to the other. The movable portion or bell $c$ of the gasometer C when raised to a certain predetermined point by the gas evolved causes the lever of the rocking switch F to turn over and make contacts, so as to complete circuits through such contacts and others carried by or attached to the transposing-switches A or B to place the batteries A' in connection therewith in the charging or discharging circuit, as the case may be. When one of the batteries or sets of batteries—for example, the set of batteries A'—is in the charging-circuit, the rocking lever $a$ of the transposing switches A (a sectional elevation of which is shown in Fig. 2) will, by moving the sliding switch $e^3$ into position of contact, complete the circuit of a small relay, K, (or other suitable electro-magnetic device,) which in its turn partially completes at the mercury-cups S S or other convenient switching arrangement the actuating-circuit for placing the transposing-switch B in position of charge. The solenoid $x$ of the relay K is excited by a current from the regulating-cells R' R$^2$ R$^3$ when a circuit has been completed (as indicated by arrows 1;) from the regulating-cell R$^3$ to the junction-point $e^2$, thence, as indicated by arrows 5, to the coil $x$ of the relay K, whence it passes to the sliding contact $e^3$, to the junction-point $e^4$, and thence, as shown by arrows 1, to the regulating cell R' to complete the circuit. Thus, by the operation of the sliding-switch $e^3$ the circuit of solenoid $x$ of relay K is closed, and consequently the actuating-circuit 4 for switch-lever B is now partly completed at the mercury-cups S S, this circuit, however, being still open at the contacts $v$ of switch A. On the evolution of gas from the battery A' to the predetermined limit, as hereinbefore described, the said gas passes into the vessel E, and thence by the pipe D into the gasometer C, thereby raising the bell $c$ of the said gasometer, which is connected by the chain or cord C' and counter-weight $c^2$ to a bar or rod, $c^3$, attached to the rocking lever $f$ of the transposing-switch F, so that as the bell $c$ rises the rocking lever $f$ is caused to turn on its centers and bring the contacts $g$ $g'$ into the mercury-cups or connecting-points $h$ $h'$ of the said switch, thereby completing a circuit, as shown by arrows 1, from the mercury-cup or connecting-point $h$ to junction-point $e^4$, whence it passes to the regulator-cells R' R$^2$ R$^3$, to the junction-point $e^2$, and thence through the solenoid-coils $i$ of the switch A to the mercury-cups or connecting-point $k$ and on to the mercury-cup or point $h'$ to complete the circuit. The solenoid $i$ is thus excited and attracts an armature attached to the rocking lever $a$, causing the lever to rock on its centers, so as to raise the contacts on the end $a'$ of the said lever out of the mercury-cups $a^3$, which connect the battery A' with the charging-mains and cause the contacts on the opposite end, $a^5$, of the rocking lever $a$ to descend into the mercury-cups or connecting-points $a^6$, which connect the said battery with the discharging-mains. The charging-circuit is maintained unbroken when the lever $a$ is thus moved by contacts $l$ on the end $a^5$ of the lever entering mercury-cups or connecting-points $m$, thereby establishing the circuit indicated by arrows 2 from the charging-main G to the mercury-cup $m$ on the switch A, and thence through a resistance, I, (which latter is thus placed in parallel with the battery before the complete separation of the battery from the charging-circuit,) to mercury-cups or connectors $w$ on the switch B, and thence to the charging-main G'. When the battery has been removed from the charging-circuit, the resistance I is short-circuited, as shown by arrows 3, through the mercury-cups or connectors $o$ and $n$ on the switches A and B, respectively.

During the period in which the charging-current is passing through the resistance I and short circuit 3 the charging-circuit of the batteries is broken and an electro-magnetic device, K$^2$, in the charging-circuit, (and actuated thereby,) which previously closed (by the attraction of its armature due to the passage of a current through its coils) a relief-valve, $d$, in a pipe, D$^2$, communicating with the pipe D, through which the gas enters the gasometer C, is rendered inactive, so that the relief-valve $d$ will then open either by gravity or by the pull of a spring or weight and allow the collected gas in the gasometer C to escape through the pipe D$^2$. The movable portion or bell $c$ of the gasometer C will accordingly fall or return to its original position, and in so doing raise the contacts $g$ $g'$ on the rocking switch F out of the mercury-cups or connectors $h$ $h'$ and lower contacts $q$ $q'$ into the mercury-cups or connectors $r$ $r'$, thereby completing a circuit, as shown by arrows 4, from the mercury-cup or connector $r'$ to the junction-point $e^5$, and through the regulator-cells R$^4$ R$^5$ R$^6$ and junction-point $e^6$ to the mercury-cups or connectors $s$ of the relay K, whence it passes to the solenoid coil or coils $t$ of the switch B, and through the mercury-cups or connectors $u$ of the said switch B to the mercury-cups or connectors $v$ of the switch A, thence to the second contact at $q$ $r$ of the switch F to complete the circuit. Thus the circuit of the actuating-solenoid $t$ of switch B is completed, and said solenoid consequently attracts its armature connected with switch B and turns the latter to the position necessary to connect batteries B' in the charging-main. As the switch B rocks on its pivot and transfers batteries B' from the discharging to the charging main, the short-circuiting device and resistance I, which maintained the charging-circuit intact, are removed in reverse order to that in which they were inserted by the reverse operation of the actuating-contacts at $w$ and $n$ of the switch B and the circuits shown by arrows 2 and 3. While the rocking lever $b$ of the switch B is moving over to place the battery thereof in the charging-circuit a projection, $w'$, on the said lever strikes the arm or lever $k^2$ of the relay K, so as to raise the contacts of the said relay out of the mercury-cups $s$, and thereby break the circuit which had been partially completed by the actuation of its controlling device. When the battery or set of batteries in connection with the switch B has become fully charged, the gas evolved therefrom passes through the pipe B$^2$ into the vessel E, thence through the pipe D, and is collected in the gasometer C, thereby raising the bell $c$, so as to cause the lever $f$ of the switch F to rock on its centers and bring the contact-prongs $g$ $g'$ $x^2$ $x^3$ into their corresponding mercury-cups or connectors, $h$ $h'$ $z$ $z'$. A current will then pass in the direction indicated by arrows 6 from the junction-point $e^6$ of the regulating-cells R$^4$ R$^5$ R$^6$ to the coils L of the switch B, thence to the mercury-cups or connectors $y$ and their contact-prongs on the end $b'$ of the lever $b$ to the mercury-cups or connectors $z$ $z'$ of the rocking switch F, thence taking the course indicated by arrows 4 to the junction-point $e^5$ of the regulating-cells R$^4$ R$^5$ R$^6$, thus completing the circuit. The lever $b$ of the switch B, which carries an armature, will, by the excitation of the coils L, be drawn over, thereby removing the contacts on the end $b'$ of the said lever out of their mercury-cups or connectors $b^3$, and consequently removing the battery of the switch B from the charging-circuit and placing it in the discharging-circuit, which latter is completed by the contact-prongs on the end $b^5$ of the lever $b$ entering the mercury-cups or connectors $b^7$. The charging-circuit is maintained by the insertion of the resistance I through circuit shown by arrows 2 and short circuit shown by arrows 3 in the manner described with reference to the battery A'. The charging-current to the batteries being broken by the movement, as before described, of the lever $b$ of the rocking switch B, the valve $d$ of the electro-magnetic device $K^2$ is released in like manner to that described with reference to the movement of the lever $a$ of the rocking switch A, and the gas contained in the gasometer is thus allowed to escape, causing the bell $c$ of the gasometer C to fall and bring the lever $f$ of the rocking switch F again to the position shown in the drawings, in which the contact-prongs $q$ $q'$ are inserted in the mercury-cups or connectors $r$ $r'$. The apparatus is then in readiness for a repetition of the processes, as described; but both batteries having been fully charged, it is now impossible for the battery A', attached to the rocking switch A, to be recharged until a circuit, as indicated by arrows 7, has been completed from the generating-station, and which, by energizing a small relay local battery or other source of electricity, as at M, controls the movement of the rocking switch A into the charging position by making the contact at $S^2$, thereby completing a circuit, as indicated by arrows 8, through the solenoid-coil of the magnet $i'$ of the rocking switch A to mercury-cups $i^2$, and thence to mercury-cups $i^3$ on the switch B, whence it passes to mercury-cups $i^4$ on the switch F, and through contact-prongs $i^6$ it follows the course indicated by arrows 8 and 1 to the junction-point $e^4$, and thence to the regulator-cells R' $R^2$ $R^3$, from the opposite poles of which regulator-cells it passes to the junction-point $e^2$ and back to the contact $S^2$ through arrows $1^x$. The completion of the circuit through arrows 8, as just described, not only brings the contact-prongs on the end $a'$ of the lever $a$ of the rocking switch A into the contacts $a^3$, but by such movement of the said lever causes the completion of the circuit (indicated by arrows 5) through the coils $x$ of the relay K on the rocking switch B, thus preparing for the completion of the circuits, enabling rocking switch B to come into action at its proper time, as before described.

It will be seen that the object of the relay S is to prevent the return into the charging-circuit of the battery A', attached to the rocking switch A, when such return is undesirable or unnecessary. The circuit 7, by which the relay S is actuated, is shown as provided with a circuit-closing key, $S^7$.

Z represents an apparatus in connection with the distributing-mains for the purpose of regulating the electro-motive force at the discharge-circuit, so that when the two sets of batteries are placed in parallel the charging of one by the other shall not take place and that the two sets of batteries shall divide between them equally, or nearly so, the total discharge required, and also that the overdraft of one of the sets of batteries be prevented. This apparatus may consist of a solenoid coil and core, as illustrated, the coil being maintained in parallel or compound connection (the latter being used when it is desired to maintain the electro-motive force constant at an electrically distant point) with the distributing-mains at any desired points— such as at $Z'$ $Z^2$—but any form of instrument acting the part of a voltmeter or pressure gage or indicator and capable of making contacts with its movable portion may be used. It must, however, be provided with two sets of contacts, as at $y$ $y'$, for the purpose of actuating other apparatus by the movement of its core or other movable portion, making or breaking either or both of the circuits controlled by such contacts. Any rise or fall in electro-motive force at or in the distributing-mains will have a corresponding effect upon the core or armature $Z^3$ of the solenoid-coil or like electro-magnetic device. This movement of the core or armature is made to actuate contacts, as at $y$ $y'$, which complete circuits through two solenoids or electro-magnets, Y $Y^a$, so that when the electro-motive force in the discharge-circuit of one of the batteries has risen or fallen the core or armature of the relay-magnets Y or $Y^a$ will be moved in directions corresponding, respectively, to the rise or fall, and will make contacts at points shown by $Y'$ $Y^2$ $Y^3$ $Y^4$ $Y^5$ $Y^6$, and complete circuits of an apparatus, $R^a$ or $R^b$, for inserting into or removing from the discharge-circuits of either battery a counter-electro-motive force, this latter operation being performed by first inserting or removing a resistance, $r^a$ or $r^b$, and immediately afterward a convenient number of cells— such as $R'$ $R^2$ $R^3$ or $R^4$ $R^5$ $R^6$—containing separate leaden plates suspended in an electrolyte or such other convenient means of obtaining electro-motive force.

The apparatus Y may consist of any arrangement of solenoid-core or electro-magnets with armatures and arranged so that a current in opposite halves of the coil produce opposite movements of a set of contacts, the current in one half of the coil tending to move the armatures or core or cores so as to complete such contacts, the current through the other half tending to move the armature so as to break the said contacts.

The apparatus as illustrated is a convenient form; but it will be readily seen that other electro-magnetic devices may be made to answer the purpose.

Whenever battery A', attached to rocking switch A, is being charged, the movable portion or lever $a$ of the said transposing or rocking switch will make a sliding or other suitable contact or contacts, as at W', and complete that circuit of the relay-solenoid Y or such like device, which causes the solenoid core or armature to move or make the contacts at Y' $Y^2$ $Y^3$ or any of them which were previously broken, thus causing the insertion of the whole of the counter-electro-motive force into the discharge-line. This will be accomplished by a current, as shown by arrows 10, from the regulator-cell $R^3$ through the lower coil of the relay Y, thence to the contacts on the rocking switch A at W' to the junction-point $e^4$, and thence to the opposite pole of the regulator-cells at R' by wires 1. At the same moment the circuit (shown by arrows 11) through contact $y'$ and solenoid-core $Z^3$ to the junction of arrows 11 with arrows 1 and the regulator-cells at R' $R^2$ $R^3$ of the alternative end of the relay Y at the contacts X on the rocking switch A will be broken by the upward movement of the end $a^5$ of the lever $a$, raising the connecting-prongs out of the contacts at X. The return of the battery A' to the circuit of discharge will by the necessary motion of the lever $a$ of the rocking switch A restore the original connections, so that the electro-motive force existing at the discharge-circuit of the battery A' shall be kept nearly normal by the regulator Y, being completely under the control of the solenoid-coil Z and its core $Z^3$. The object of the above-described operation is to insure that at the moment when the battery A' is placed or the discharge-circuit in parallel with the battery in connection with the switch B the maximum counter-electro-motive force shall be present in the discharge-circuit of battery A', so that its electro-motive force, which may be greater than that of battery B', shall not be able to overcome the electro-motive force developed by the latter battery at the distributing-mains.

The apparatus $R^a$ $R^b$ consists of a set of contacts arranged in connection with a suitable galvanic couple for the purpose of constituting a counter-electro-motive force that a comparatively sparkless by-pass is obtained.

Figs. 4 and 5 illustrate, on an enlarged scale, a convenient form of one of these apparatuses. It is provided with a rocking lever, $A^4$, which is moved by the completion of an electric circuit, (shown by arrows 12, 13, and 14, Fig. $1^a$,) actuating the core around the solenoid or armature $A^5$ of an electro-magnet, $R^{a\prime}$. This apparatus has five mercury-cups, $H^a$ $H^{a2}$ $H^{a3}$ $H^2$ $H^2$, or other convenient form of contacts, and the oscillation of the lever $A^4$ is controlled by a dash-pot, $B^5$, containing glycerine or other suitable fluid.

Between the mercury-cups or contacts $H^a$ and $H^{a2}$, at one end of lever $A^4$, is placed a resistance, $r^a$, Fig. $1^a$, and the contact prongs or bridge, which complete circuit with the resistance and counter-electro-motive-force cell through cups $H^{a2}$ and $H^{a3}$, are made somewhat longer than the other prong at $H^a$, Fig. 5, so that when the lever $A^4$ is rocking in the direction to make the contact $H^{a3}$ the counter-electro-motive-force cell R' will be circuited through this resistance before the said cell is cut out of circuit by the rising of the opposite end of the lever carrying the contacts at $H^2$. The next instant the counter-electro-motive-force cell will be cut out of the circuit by the continuation of the motion of the lever $A^4$, and the resistance will be immediately short-circuited by the completion of the stroke of the said lever bringing the shorter prong at $H^{a3}$ into its mercury-cup or other contact.

The cycle of operations above described, which relate to the insertion or removal of a counter-electro-motive force into or from the circuit of discharge, is repeated for the battery in connection with the switch B, the apparatus Z having its contacts $y$ $y'$ made so as to be applicable to the working of the relay $Y^a$ in the same manner as with the working of the relay Y, already described, and, the circuits being similar to those existing for the working of the relay Y, no further description is necessary. One of these circuits is indicated by the arrows 16 and leads to the contacts $X^5$ on switch-lever A.

The path of the discharging current from battery A' at the points $a^6$ from H is similar to the arrangements for the discharge-circuit of battery in connection with the switch B from the point $b^7$. When the counter-electro-motive-force cells R' $R^2$ $R^3$ are in action, the course of the current from the point $a^6$ is along the dark line H to the mercury-cup or contact $H^a$, and, as shown by arrows $H'^a$, through contacts and bridge $H^2$ to the cell R'; thence, as shown by arrows 1 and $H'^a$, to the discharging-circuit of lamps or other devices.

The operation of inserting these counter-electro-motive-force cells in the circuit commences with the insertion of $R^3$, then the insertion of $R^2$, and finally R', by the operation of the contacts Y', $Y^2$, and $Y^3$, following each other in rotation, and it will be clear that $R^3$ may be in the circuit alone or in series with $R^2$, and in the latter case the discharge-current will pass, as before described, from the point $a^6$, and of course similarly with regard to rocking switch B and its like attachments, from the point H through the circuit, as shown by the dark line, to the mercury-cups or connectors $H^a$; thence across the bridge $H^{a\prime}$ to the mercury-cups or connectors $H^{a2}$ and $H^{a3}$; thence by the dark line $H^2$ to the mercury-cup or connector $H^{b\prime}$ and along the line $H^{2a}$ to the mercury-cup or connector $H^{b2}$ and the bridge or connector to the cell $R^2$; thence by arrows 1 and $H'^a$ through $R^3$, the position of the contacts Y' $Y^2$ on the relay Y being such as to complete the circuits around $R^{a2}$ and $R^{a3}$, and so by the energizing of the controlling device to draw the bridge-pieces into the contacts at $H^{b2}$ and $H^{b3}$.

The description above given is the same for the insertion of any or all of the counter-electro-motive-force cells, and does not therefore require repetition for the apparatus $R^b$, which is in connection with the discharging-circuit of battery attached to rocking switch B.

To render the current in the discharge-circuit of each of the batteries equal, or nearly so, when together in parallel, a current-balance, as shown at Q, is provided. This balance may consist of a pair of coils and core wound similarly to those of the apparatus $Y Y^a$ to carry the discharge-current or a suitable proportion thereof. In the drawings I have shown this apparatus in the form of a scale-beam. The discharge-current from each battery or equal proportion thereof must pass round coils whose effect is to oppose each other, and it is evident that when the currents from each of the two batteries are equal the the beam $q^x$ of the balance will be held in a mean or horizontal position, the contacts at $q^2$, $q^3$, $q^4$, $q^5$, $q^6$, and $q^7$ being broken. To prevent "hunting" or undue oscillations of the beam $q^x$, springs or dash-pots, or both, are provided, tending to hold the beam in a mean position. Immediately, however, on an increased current passing from either of the batteries the core or its equivalent, around which such increased current is passing, will be drawn into its coil or equivalent, so that circuits through $q^2 q^3$ will be completed by the contact-prongs $q^7$, or through $q^4 q^5$ by the contact-prongs $q^6$. On such completion of the circuits at $q^2 q^3$ a current will pass to the relay $Y^a$, causing the insertion into the discharge-circuit of the battery, which at the moment is yielding more than its proper proportion of one or more of the counter-electro-motive-force cells until equality is again restored in the discharging currents, when the beam $q^x$ of the apparatus Q will again occupy an intermediate position, removing both sets of prongs $q^6 q^4$ out of action. The apparatus performs its work of equalizing the discharge-current from the batteries independently of the movement of the apparatus Z, which latter is intended only to regulate the electro-motive force of the discharge-mains.

Having now described and particularly ascertained the nature of my said invention and in what manner the same is to be performed, I declare that what I claim is—

1. In apparatus for automatic electrical distribution and change of secondary batteries, the combination of a set or pair of switching apparatus for transferring the connection of a battery or set of batteries from series to parallel, and vice versa, and a resistance in a branch circuit having contacts controlled by said switching apparatus, whereby the continuity of the charging-circuit is maintained through said resistance while the batteries are being transferred, substantially as described.

2. The combination of switching apparatus A and B, batteries A' and B', gas-pipe-sealing apparatus E, gasometer C, and switch F, with their connecting-circuits, substantially as and for the purpose hereinbefore described.

3. The combination, with the switching apparatus A and B, batteries A' B', gas-collecting chambers, pipe-sealing apparatus E, and gasometer C, of the switch F and valve apparatus $K^2$ and their connecting-circuits, substantially as and for the purpose hereinbefore described.

4. In a system of electrical distribution, the combination, with the secondary batteries and distributing-main supplied thereby, of the electro-magnetic regulating apparatus Z, contacts actuated thereby, and counter-electro-motive-force cells and controlling apparatus for effecting the regulation of the electro-motive force in the said distributing-main, substantially as described.

5. The combination, with the switching apparatus A B for transposing the connections of a battery from parallel to series, and vice versa, of connections and circuits controlled directly by the movement of the said switches, an electro-magnetic device connected with the distributing-main, and circuits and contacts controlled by said device for regulating the electro-motive force in the discharging-circuit of said batteries, substantially as hereinbefore described.

6. In a system of electrical distribution, means for insuring equality of discharge-current from two sources of electricity by the insertion in the respective circuits of a sufficient counter-electro-motive force, the said means consisting of the current-balance apparatus Q, in combination with the switching apparatus $R^a$ and $R^b$, and cells attached thereto, substantially as hereinbefore described.

7. The combination, with one or more pairs of batteries and one or more pairs of switches for transposing the connections of the said batteries from series to parallel, and vice versa, of a gasometer, C, gas-seal E, switch F, electro-magnetic valvular device $K^2$, regulating apparatus Z, counter-electro-motive-force cells $R'$ $R^2$ $R^3$ $R^4$ $R^5$ $R^6$, and current-balance Q, with their connecting-circuits, substantially as and for the purpose hereinbefore described.

8. In a system of electrical distribution, the combination, with a set or sets of batteries provided with apparatus for automatically charging and discharging the said batteries, of cells used as counter-electro-motive force for the regulation of the electro-motive force in the discharge-circuit of the said batteries, substantially as hereinbefore described.

In testimony whereof I have signed my name to this specification in the presence of two subscribing witnesses.

FRANK KING.

Witnesses:
  FRED. GOATER,
  R. CALLON,
    *Both of 9 Birchin Lane, E. C.*